United States Patent [19]

Amemori et al.

[11] Patent Number: 4,554,892
[45] Date of Patent: Nov. 26, 1985

[54] WATER-COOLED DIESEL ENGINE FOR USE AS OUTBOARD ENGINE

[75] Inventors: Koichi Amemori; Toshihiko Kawabe, both of Takatsuki, Japan

[73] Assignee: Yanmar Diesel Engine Co., Ltd., Osaka, Japan

[21] Appl. No.: 554,403

[22] Filed: Nov. 22, 1983

[30] Foreign Application Priority Data

Jun. 21, 1983 [JP] Japan ................... 58-110190
Jun. 22, 1983 [JP] Japan ................... 58-111053
Jul. 26, 1983 [JP] Japan ................... 58-136526

[51] Int. Cl.$^4$ ................... F01P 3/14; F01P 3/16
[52] U.S. Cl. ................... 123/41.82 R; 123/193 CH; 123/193 CP; 123/195 P; 440/89; 440/900
[58] Field of Search ............ 440/900, 53–65, 440/89; 123/41.74, 263, 41.82, 193 C, 193 CH, 41.84, 193 H, 260, 47 A, 193 CP, 41.83, 41.72, 41.82 A, 41.85, 195 P; 204/25; 114/103; 60/321; 29/156.4 WL

[56] References Cited

U.S. PATENT DOCUMENTS

| | | | |
|---|---|---|---|
| 2,219,241 | 10/1940 | Tebldi | 123/41.82 R |
| 2,494,742 | 1/1950 | Buske | 123/41.82 A |
| 3,145,695 | 8/1964 | Conover et al. | 123/41.74 |
| 3,351,044 | 11/1967 | Pomeroy | 123/41.82 R |
| 3,691,914 | 9/1972 | Reisacher | 123/41.82 |
| 3,921,607 | 11/1975 | Kawamoto | 123/260 |
| 3,973,547 | 8/1976 | Weiss | 123/193 CH |
| 4,016,850 | 4/1977 | Bloemers | 123/193 C |
| 4,028,887 | 6/1977 | Tsutsumi | 123/193 H |
| 4,092,956 | 6/1978 | List | 123/41.74 |
| 4,112,882 | 9/1978 | Tews | 123/47 A |
| 4,114,373 | 9/1978 | Sakai et al. | 123/193 H |
| 4,221,190 | 9/1980 | Komiyama | 123/263 |
| 4,221,196 | 9/1980 | Castarede | 123/41.84 |
| 4,276,033 | 6/1981 | Krovina | 114/103 |
| 4,365,594 | 12/1982 | Obermayer | 123/193 H |

Primary Examiner—William A. Cuchlinski, Jr.
Attorney, Agent, or Firm—Armstrong, Nikaido, Marmelstein & Kubovcik

[57] ABSTRACT

A water-cooled diesel engine suitable for use as a marine outboard engine, which has a cylinder head and a cylinder block formed as an integral unit from aluminum or an aluminum-base light-weight alloy. A cooling water jacket, intake ports and exhaust ports are formed in the cylinder head and the cylinder block.

6 Claims, 8 Drawing Figures

WATER-COOLED DIESEL ENGINE FOR USE AS OUTBOARD ENGINE

BACKGROUND OF THE INVENTION

The present invention relates to a water-cooled diesel engine for use as an outboard engine.

Hitherto, 2-cycle gasoline engines operable with a fuel mixture have been used most popularly as marine outboard engines mounted on the stern of small-sized vessels, because this type of engine best meets the requirements for light weight and small size which are the essential requisites for marine outboard engines. Thus, diesel engines have been used very seldom as marine outboard engines. The current rise in the price of gas fuel, however, has given a rise to the demand for use of diesel engines as marine outboard engines.

The use of a diesel engine as a marine outboard engine, however, poses various problems. Namely, a diesel engine can produce only a comparatively small power per unit weight because of its heavy weight due to the use of cast iron as the material of the cylinder block and cylinder head. In addition, the number of parts is considerably large because the cylinder block and the cylinder head are constructed separately from each other and jointed to each other by means of bolts with a gasket interposed therebetween. In addition, the seal of the gasket tends to become imperfect.

An outboard engine has to be swung manually for steering and has to be tilted up as desired. In addition, such an engine has to be transported and mounted easily. Furthermore, an outboard engine is required to have a centroid on the neutral axis thereof. Namely, if the centroid is offset to the left or right, the maneuverability of the engine will be impaired unfavorably.

In order to obviate these problems, it is necessary to meet the requirements such as minimized weight of the outboard engine unit including the engine itself, symmetry of the outboard engine with respect to the plane parallel to the running direction, minimized height, compactness of the outboard engine, reduction in the number of the parts, simplified construction and reduced cost.

However, when a diesel engine is used as a marine outboard engine, the compactness of the engine is affected by the position of the exhaust gas outlet.

SUMMARY OF THE INVENTION

Accordingly, an object of the invention is to provide a water-cooled diesel engine for use as a marine outbard engine in which the cylinder block and the cylinder head are constructed as a unit from a light-weight metal so that the engine output power per unit weight of the engine is increased to attain a higher propulsion power of the outboard engine.

Another object of the invention is to provide a diesel engine for use as a marine outboard engine in which the body of the engine is made compact and the number of parts is reduced to facilitate assembly.

To these ends, according to the invention, the cylinder block and the cylinder head are formed as a unit from a light-weight alloy and the intake port and the exhaust port are formed in the cylinder head.

Other objects of the invention will become clear from the following description of the preferred embodiments taken in conjunction with the accompanying drawings.

DESCRIPTION OF THE PREFERRED EMBODIMENTS

Figure 1:
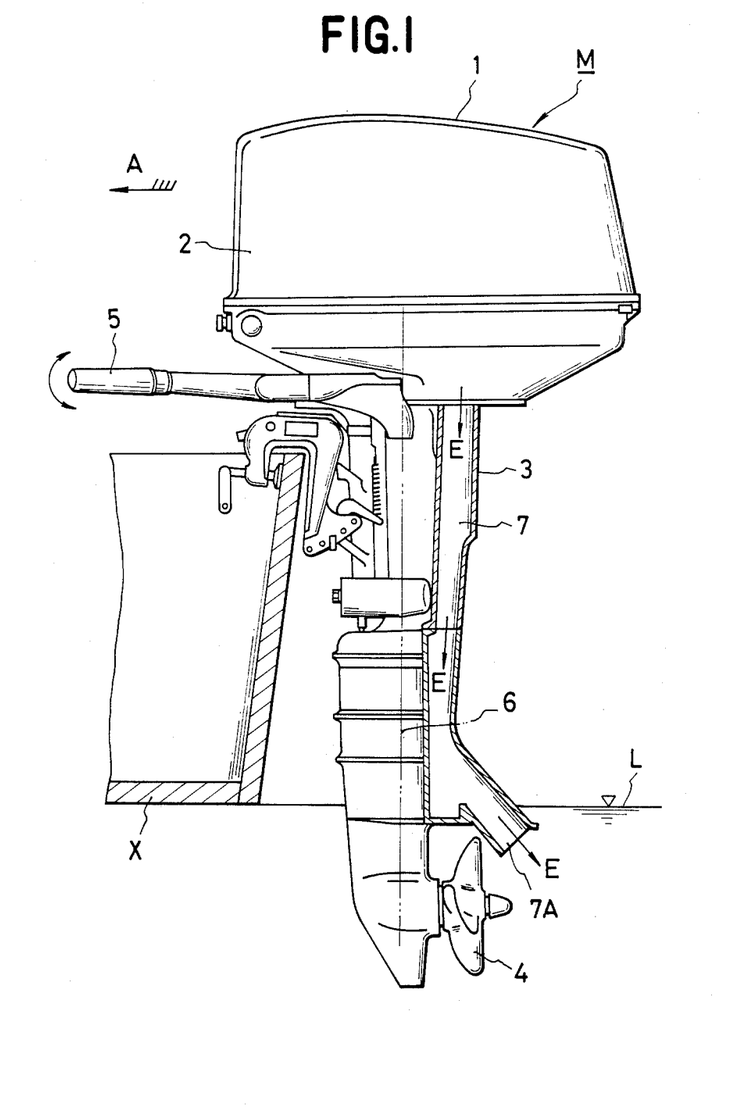
FIG. 1 is a partly-sectioned side elevational view of an outboard engine embodying the present invention.

Referring to FIG. 1, an outboard engine M has a diesel engine 2 accommodated by a cowling 1. The power of the diesel engine 2 is transmitted to a propeller 4 provided at the lower end of the body 3 of the outboard engine M to rotate the propeller 4 through a vertical thrust shaft (shown by two-dot-and-dash line) disposed in the body 3 of the outboard engine. As the propeller 4 is rotated, a small-sized vessel mounting the outboard engine is propelled to run in the direction of an arrow A. The vessel is steered as the outboard engine M is swung to the left and right by means of a tiller 5 which projects forwardly from the outboard engine M.

Exhaust gas E emitted from the diesel engine 2 flows through an exhaust passage 7 in the body 3 of the outboard engine and is discharged into the ambient water through an exhaust opening 7A which is positioned below the water level L during running of the vessel.

Figure 2:
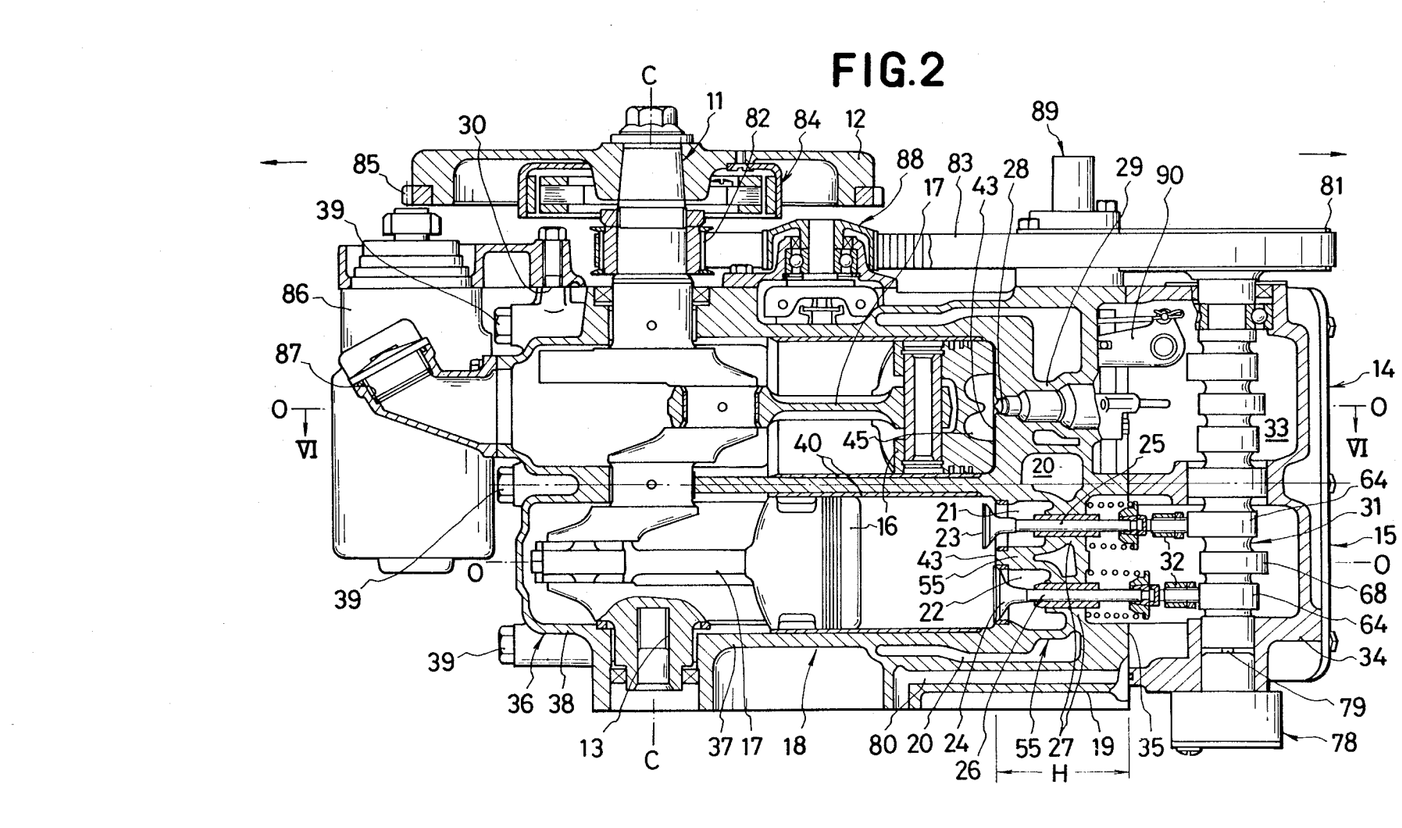
FIG. 2 is a vertical sectional view of a diesel engine in accordance with a first embodiment of the invention.

Referring now to FIG. 2, a diesel engine 2 in accordance with the invention has a crankshaft 11 provided at its upper end with a fly-wheel 12. This engine, designed specifically for use as a marine outboard engine, is provided in the inner periphery of the lower end bore thereof with an involute spline 13 by means of which it is connected to an output shaft (not shown). In the illustrated embodiment, the engine 2 has two cylinders 14 and 15 which are arranged one on top of the other. The axes O—O of these cylinders extend horizontally in the fore and aft direction of the vessel. Numerals 16 and 17 denote pistons and connecting rods, respectively.

Figure 6:
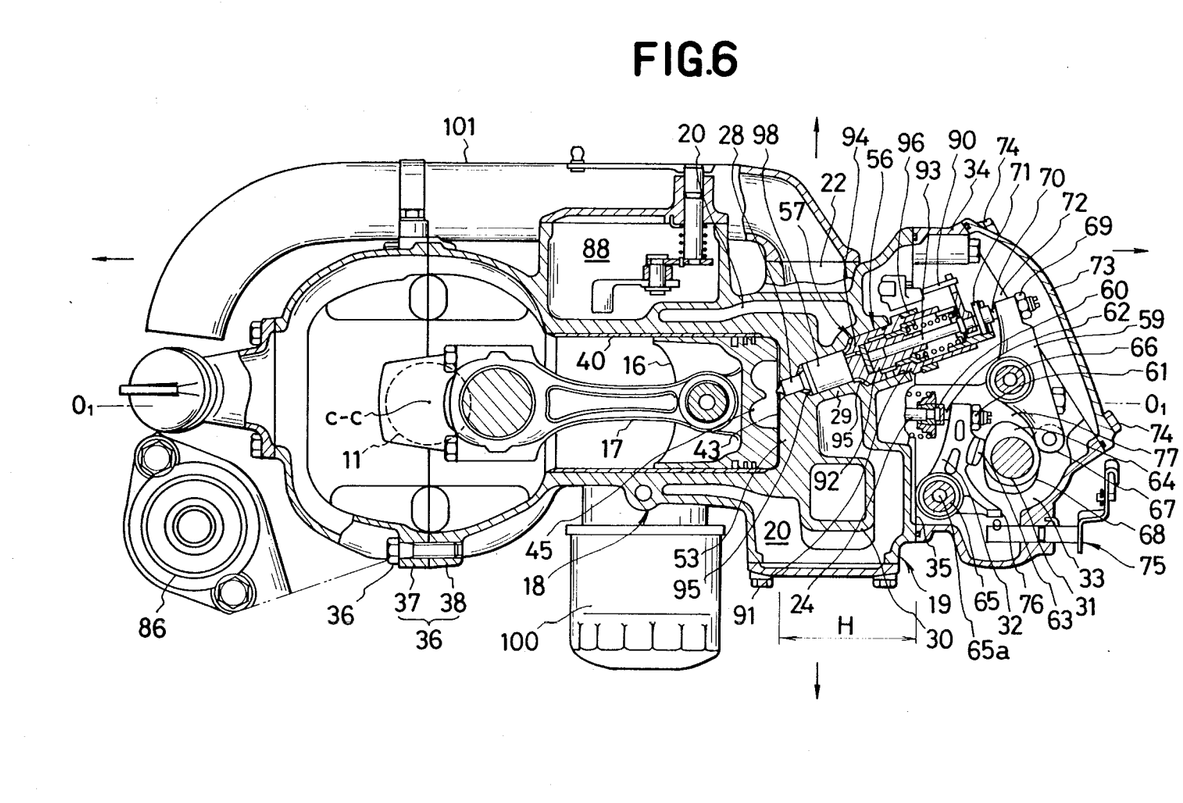
FIG. 6 is a sectional view taken along the line IV—IV of FIG. 2.

A cylinder block 18 and a cylinder head 19 are formed by casting as a unit from aluminum or an aluminum-base light-weight alloy. A cooling water jacket 20 is formed in the cylinder block 18 and the cylinder head 19 which are integral with each other. The cooling water is introduced by a cooling water pump (not shown) into the cooling water jacket 20. Exhaust ports 21 and intake ports 22 are formed in the cylinder head 19. The cylinder head 19 is provided also with cylindrical bosses 27 for supporting the stems 25, 26 of the exhaust valves 23 and intake valves 24, as well as cylindrical bosses 29 defining mounting holes for the fuel injection device 28. As shown in FIG. 6, an exhaust manifold 30 is formed as a unit with the cylinder head 19. Each of the cylinders 14 and 15 has one exhaust valve 23 and one intake valve 24. Thus, four valves in total, i.e. two exhaust valves 23 and two intake valves 24 are arranged in the vertical plane in a horizontal posture, and are adapted to be driven by a common cam shaft 31 through valve arms 32 in a manner which will be explained later. A case 34 defining a valve arm chamber 33 accommodating the cam shaft 31 and the valve arms 32 is fixed to one end surface of the cylinder head 19 by means of bolts (not shown).

The diesel engine 2 has a crank case 36 which can be split into two parts: Namely, a first part 37 adjacent to the cylinder block 18 and a second part 38 opposite to the cylinder block 18. The first part 37 is formed as a unit with the cylinder block 18 while the second part 38 is fastened by bolts 39 to the first part 37. The plane at which two parts 37 and 38 are jointed contains the neutral axis C—C of the crankshaft and is perpendicular to the axes O—O of the cylinders. The part 38 of the crank case is made of a material equal or similar to that of the cylinder block 18.

Figure 3:
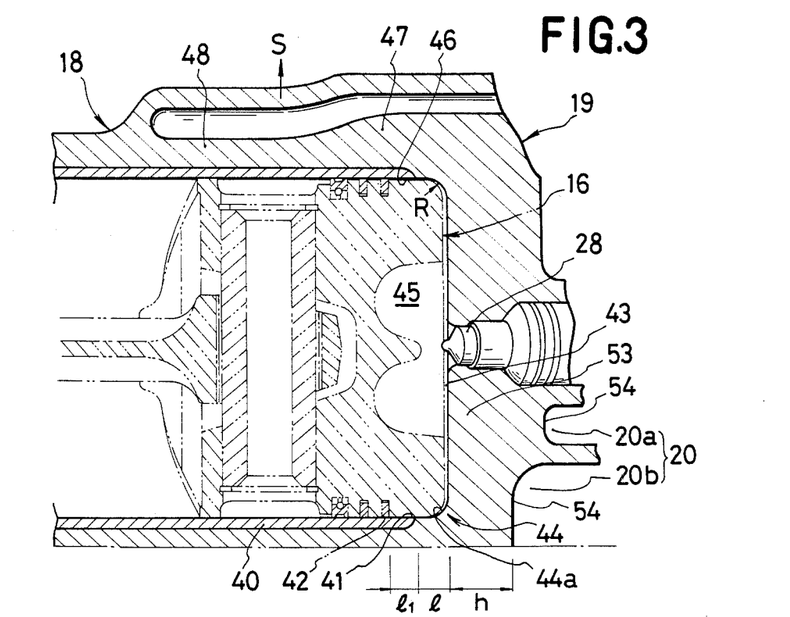
FIG. 3 is an enlarged view of a portion of the diesel engine shown in FIG. 2.

A detailed description will be made hereinunder as to the construction of every portion of the diesel engine. Referring to FIG. 3 which is an enlarged view of a portion of the engine shown in FIG. 2, liners 40 presenting the sliding surfaces for the pistons 6 are made from cast iron and are cast in the cylinder block 18. An alloy layer is formed along the boundary between the liner 40 and the cylinder block 18 and the liner 40 is jointed to the cylinder block 18 through this alloy layer. The end 41 of the liner 40 is projected towards the cylinder head 19 by a small distance l from the top ring 42 on the piston 16 at the top dead center, and is comparatively spaced from the explosion surface 43 of the cylinder head 19.

Namely, the distance l between the explosion surface 43 to the end 41 of the liner 40 is selected to be as large as possible without causing any obstacle to the sliding motion of the top ring 42. The reference numeral 44 denotes a corner portion near the outer periphery of the explosion surface 43. That is, the cylinder block 18 and the cylinder head 19 join each other at the corner 44. The corner surface 44a of the corner 44 facing the combustion chamber 45 has an arcuate cross-section of a radius R.

According to this arrangement, it is possible to obtain a mechanical strength of the corner 44 large enough to withstand the force produced by the explosion pressure in the combustion chamber 45. Namely, although the stress produced by the explosion tends to be concentrated to the corner 44, the stress can be dispersed by the roundness of radius R of the corner surface 44a' so that the cracking in the corner 44 is avoided advantageously. Furthermore, since the length l of the corner 44 is selected to be large, it is possible to obtain a large radius R of curvature so that the stress dispersing effect is enhanced to ensure a sufficiently high mechanical strength.

Figures 4, 5:
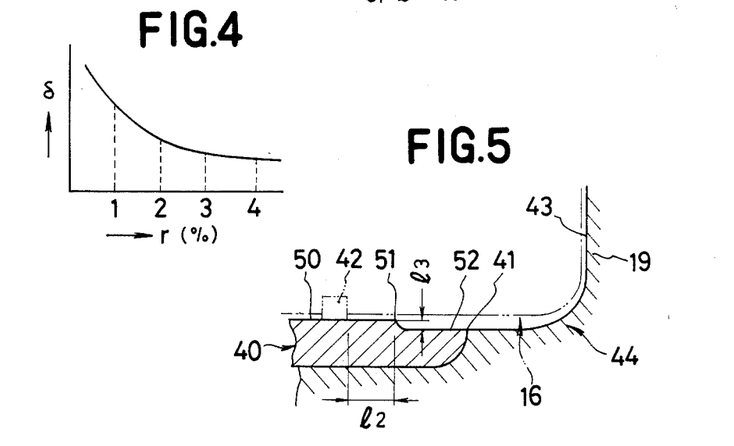
FIG. 4 is a graph showing the relationship between the radius of corner and stress occurring therein.
FIG. 5 is a schematic enlarged view of a portion shown in FIG. 2.

A test result shows that the strength of the corner 44 can be increased to a sufficiently high level when the radius R is selected to be about 2% of or greater than the cylinder inside diameter but smaller than the distance l to permit the movement of the piston 16. More specifically, referring to FIG. 4, representing the ratio of the radius R to the cylinder inside diameter by $\gamma$ (%), the stress $\delta$ is drastically decreased as the ratio $\gamma$ is increased when the ratio $\gamma$ is smaller than 2%. However, the decrease of the stress $\delta$ becomes not so appreciable when the ratio $\gamma$ is increased beyond about 2%. It is, therefore, possible to obtain a sufficiently high mechanical strength at the corner 44 shown in FIG. 2 by selecting the value of the ratio $\gamma$ to be about 2% or greater.

Referring now to FIG. 3, the upper portion 47 of the cylinder block 18 surrounding the end portion 46 of the liner 40, as well as the cylinder head 19, is expanded outwardly beyond the intermediate portion 48 of the cylinder block 18 as indicated by arrow S. By thickening the upper portion 47 of the cylinder block 18, it is possible to prevent the upper portion 47 from expanding radially outwardly when subjected to the explosion pressure and, hence, to avoid undesirable formation of a gap between the upper portion 47 and the liner 40. Consequently, leak of the gas into the crank case through the gap between the liner 40 and the cylinder block 18 can be avoided so as to prevent deterioration of the engine performance attributable to such a leak of gas. It is not necessary to thicken the wall of the intermediate portion 48 of the block 18 adjacent to the crank case 36 because such intermediate portion is not subjected to a high explosion pressure. Thus, it is possible to reduce the weight of the engine without causing any problem concerning the strength, by thinning the wall of the intermediate portion of the cylinder block 18. The thickening of the upper portion 47 increases the cross-sectional area of the upper portion 47 so that the force in the axial direction of the cylinder produced by the pressure acting on the explosion surface 43 can be born by a greater area of the upper portion 47. Consequently, the stress in the corner 44 can be decreased correspondingly.

Referring now to FIG. 5, the inner surface of the liner 40 is finished by honing. The surface 50 finished by the honing extends between the portion of the inner surface of the liner 40 adjacent to the crank case to the end portion 51 of the same. More specifically, the end portion 51 is located at a position which is offset by a distance $l_2$ which is about 1 to 4 mm from the position of the top ring 42 on the piston 16 at top dead center towards the explosion surface 43, so that the top ring 42 slides only within the area of the surface 50 finished by honing. The portion of the inner peripheral surface of the liner 40 between the end portion 51 and the extreme end 41 is recessed radially outwardly by a distance $l_3$ which is about 0.1 to 0.2 mm from the surface 50 finished by honing, so as to provide a recess 52 serving as a relief for the honing. This arrangement offers the following advantage. Namely, the honing tool which is inserted into the liner 40 from the crank case cannot reach the extreme end 41 of the liner 40, because the tool is interferred by the cylinder head 19, so that it is not possible to effect the honing up to the extreme end. Therefore, when the liner 40 before the honing has a constant inside diameter up to the end 41, a boundary or step of honing is left in the end portion of the inner peripheral surface of the liner 40 after the honing. In addition, since the inside diameter of the liner is reduced at the end portion of the latter as compared with the surface 50 finished by the honing, the piston 16 may be undesirably caught by such end portion of the reduced inside diameter. Such problems, however, can be obviated in the engine of the invention because of the presence of the honing relief portion 52. In addition, the provision of the honing relief portion 52 in the liner 40 effectively prevents the honing tool from acting on the cylinder block 18 which is made from aluminum or its alloy so that the unfavourable clogging of the honing tool is avoided advantageously.

Referring back to FIG. 3, the ceiling wall 53 of the cylinder head 19 presents at its one side the aforementioned explosion surface 43 while the other side of the same faces the cooling water jacket 20. The thickness of the ceiling wall 53 is greater at the central portion thereof than at the peripheral portion, so that the portion 20a of the cooling water jacket 20 adjacent to the center of the cylinder is spaced by a greater distance than the outer peripheral portion 20b of the same. By varying the thickness of the ceiling wall 53 in the manner described, it is possible to reduce the weight of the engine through reducing the mean thickness of the ceiling wall, while ensuring sufficient strength to withstand the explosion force. In the illustrated embodiment, the thickness of the ceiling wall is changed in a stepped manner. This, however, is not exclusive and the thickness of the ceiling wall 53 may be progressively and linearly increased towards the center of the latter. By so doing, it is possible to further enhance the strength of the ceiling wall 53.

As will be seen from FIG. 2, the cylinder head 19 is provided therein with exhaust valves 23, intake valves 24, exhaust ports 21 and intake ports 22, so that the overall height H as measured from the explosion surface 43 to the end surface 35 is inevitably large. Furthermore, a multiplicity of ribs 55 are mounted in the cylinder head 19 so as to form walls of the cooling water jacket 20, exhaust ports 21 and intake ports 22, as well as cylindrical bosses 27 mentioned before. Thus, the cylinder head 19 itself exhibits a sufficient strength because it has a large overall height H and because it is stiffened internally by a multiplicity of cylindrical bosses 27 and ribs 55.

Referring now to FIG. 6 which is a sectional view taken along the line VI—VI of FIG. 2, the cylindrical boss 29 for the fuel injection nozzle 28 also contributes to the enhancement of the strength of the cylinder head 19. The cylindrical boss 29 extends from a position near the center of the ceiling wall 53 substantially along the axis of the cylinder, so that it provides a greater effect of stiffening the cylinder head 19 as compared with other cylindrical bosses 27 shown in FIG. 1 and the ribs 55. The fuel injection device takes the form of a unit injector 57 in which a fuel injection nozzle 28 and a fuel pump 56 are constructed as a unit with each other. This unit injector 57, when fitted in the cylindrical boss 29 as will be explained below, serves to further increase the rigidity or strength of the cylinder head 19.

The construction of the unit injector 57 will be explained briefly. The unit injector 57 is composed of a fuel injection pump 56 having a body 91 and a fuel injection nozzle 28 having a sleeve 98 connected to the end of the body 91 of the fuel injection pump 56. As a plunger 93 moves reciprocatingly within a barrel 92 mounted in the body 91, fuel is supplied from the fuel injection pump 56 to the fuel injection nozzle 28 through a pressurized fuel passage 94 formed in the body 91. The unit injector 57 is provided with an annular step 95 between the end portion of the body 91 and the sleeve 98. With the annular step 95 pressed onto the inner peripheral step on the cylindrical boss 29, the portion of the body 91 projected above the cylindrical boss 29 is fastened to the cylinder head 11 by means of a retainer metal 96. Therefore, an initial compression force overcoming the explosion force is applied to the center of the ceiling 53 by means of the unit injector 57. This also contributes to the increase of the strength of the cylinder head 19 so that the amount of deflection of the ceiling wall 53 is decreased effectively.

The portion of the unit injector 57 constituting the fuel injection pump 56 has an increased diameter. This portion also fits in the cylindrical boss 29. Therefore, the cylindrical boss 29 serves as a large reinforcement having a large diameter and, hence, contributes to the increase of the strength of the cylinder head 19.

The fuel injection nozzle 28 has a nozzle port which is opened when a high pressure is applied by the fuel delivered by the fuel injection pump 56. As stated before, in the unit injector 57, the fuel injection pump 56 and the fuel injection nozzle 28 are connected to each other solely through a short pressurized fuel passage 94 formed in the body 91, so that the fuel pressure established in the fuel injection pump is directly transmitted to the fuel injection nozzle 28. It is, therefore, possible to inject the fuel from the fuel injection nozzle 28 in exact correspondence with the pressure in the fuel injection pump 56 without any secondary injection over the entire region of the variance of the fuel injection rate. Furthermore, since the pressure drop along the pressurized fuel passage 94 can be diminished remarkably, it is possible to obtain a high fuel injection pressure in the fuel injection nozzle 28 which in turn promotes the atomization of the injected fuel. Furthermore, the injection from the fuel injection nozzle 28 takes place without a substantial time lag to the pumping operation in the fuel injection pump 56. According to the invention, therefore, it is possible to maintain an optimum condition for combustion to make a full use of the engine performance, partly because the secondary injection and the time lag of injection are avoided and partly because the atomization of the fuel is promoted. The avoidance of the delay of the fuel injection contributes also to improve the performance of the engine during a high-speed operation. It is remarkable that these advantages are brought about with simple construction which is devoid of any timer indispensable in conventional engines for adjusting the timing of the fuel injection.

The end of the fuel injection nozzle 28 is exposed to the combustion chamber 45 substantially at the center of the explosion surface 43, and no vortex flow chamber (sub-combustion chamber) is provided in the cylinder head 19. Since the engine is of a direct injection type as stated before, it is possible to support the unit injector 57 by the full height H of the cylinder head 19. Consequently, the unit injector 57 can be held stably and the distance between the explosion surface 43 and the other end (protector 71) of the unit injector 57 can be decreased to permit a reduction in the size of the engine as a whole. Namely, although the unit injector 57 inherently has a large length, it is possible to avoid increase of the size of the engine by designing the engine as a direct injection type engine. It should be noted that if a vortex flow chamber is formed in the cylinder head 19, the distance between the unit injector 57 and the explosion surface 43 can be increased by an amount corresponding to the size of the vortex flow chamber, so that the size of the cylinder head 19 and the size of the case 34 have to be increased.

The direct injection offers also the following advantage. Namely, in the engine having a vortex flow chamber, a heavy thermal load is imposed on the inner surface of the communication passage between the vortex flow chamber and the combustion chamber 45 during propagation of the flame from the former to the latter. In contrast, in the direct injection type engine having no vortex flow chamber, no local thermal stressing takes place in the cylinder head 19 nor in the cylinder block 18. Therefore, the cylinder head 19 and the cylinder block 18 are never damaged by heat even though they are made from aluminum or an aluminum alloy having small resistance to heat.

Aluminum and its alloys exhibit high heat conductivity at the cost of low resistance to heat. Therefore, the heat transferred to the cylinder head 19 and the cylinder block 18 from the combustion chamber 45 can be delivered promptly to the cooling water in the cooling water jacket 20, so that the cylinder block 18 and the cylinder head 19 are protected against overheating. Thus, the engine is protected against thermal damage even in this respect.

The piston 16 is provided in the top surface thereof with a recess which defines a part of the combustion chamber 45. When the piston 16 is positioned at the top dead center in its stroke, the portions of the top surface of the piston other than the central recess closely approach the explosion surface 43 or the rounded corner around the explosion surface 43 without leaving any substantial gap or clearance.

The explosion surface 43 may be conically concaved although it is flat in the described embodiment. By so doing, it is possible to enhance the strength of the cylinder block 18 and the cylinder head 19 because of an increase of the strength of the arch structure formed by the cylinder block 18 and the cylinder head 19 in the illustrated cross-section, i.e. the arch structure constituted by both leg portions formed by the cylinder block 18 at both sides of the piston 16 and the ceiling portion provided by the cylinder head 19.

An explanation will be made hereinunder as to the mechanism for actuating the fuel injection pump 56, as well as the exhaust valve 23 and the intake valve 24 (FIG. 6 shows only the valve 24). Besides the cam shaft 31 and the valve arms 32 which were mentioned before, the valve arm chamber 33 accommodates a valve arm 59 for the fuel injection pump 56. In addition, stems 25 and 26 of the exhaust valve 23 and the intake valve 24, and the fuel injection pump 56, project from the cylinder head 19 into the case 34. The stems 25 and 26 are located, for example, at the left side of the plance O—O, i.e. the plane containing the axes of the cylinder, as viewed in the direction of running of the vessel. The ends of stems 25 and 26 are located comparatively close to the head end surface 35. The stems 25 and 26 are provided at their ends with protectors 60 which are contacted by adjusting screws 62 fixed to one end respectively of the valve arms 32 by means of lock nuts 61. Each valve arm 32 is provided at its intermediate portion with a tappet 63 adapted to be actuated by a cam 64 on the cam shaft 31. Four valve arms 32 are supported at their other ends by a common valve arm shaft 65 which is vertical and supported by the case 34. The valve arm shaft 65 is offset leftwardly from the central plane O—O and the outer peripheral surface thereof is somewhat spaced from the end surface 35 of the cylinder head 19. The axis 65a of this shaft is offset by a distance of about 2 to 3 mm (about ⅓ of the valve lift) towards the end surface 35 from the end surfaces of the protectors 60 on the exhaust valve 23 and the intake valve 24 in the closing positions.

The cam shaft 31 is positioned at the rear side of the valve arm 32, i.e. at the side opposite the end surface 35, and at the left side of the lock nut 61. The shaft of the valve arm 59 extends vertically at the right side of the central plane O—O, and is disposed at the right side of the cam shaft 31. The shaft 66 also is supported by the case 34. Two valve arms 59 (only one of them is shown) are carried at their intermediate portions by the common shaft 66 and are provided at their respective one end with cam followers 67 contacted from the rear sides thereof by cams 68 on the cam shaft 31. Adjusting screws 70 are fixed to the other ends of the valve arms 59 by means of lock nuts 69. The ends of the adjusting screws 70 are contacted by the protectors 71 on the ends of the plungers 93. The adjusting screws 70 are spaced from the central plane O—O in the rightward direction. Accordingly, each unit injector is inclined to gradually get closer to the central plane O—O towards the end of the fuel injection nozzle 28.

An opening 72 is formed in the rear wall of the case 34 so as to extend from the right end towards the left end portion of the rear wall. A lid 73 for closing the opening 72 is secured by bolts 74 to the case 34. A lever-type decompression mechanism 75 is secured to the left side portion of the case 34. The decompression mechanism 75 is for manually operating valves into opening positions when the engine is to be started. The valve arm 32 is provided with an arm 76 which is adapted to be actuated by the decompression mechanism 75.

According to the construction explained hereinbefore, the rotation of the cam shaft 31 causes cams 64 to actuate exhaust valves 23 and intake valves 24 through the action of valve arms 32 and, at the same time, the cam 68 actuates the plunger 93 of the fuel injection pump 56 through the action of the valve arm 59. The timing of operation of exhaust valves 23, intake valves 24 and the fuel injection pump 56 can be adjusted by varying the positions of adjusting screws 62 and 70. Since the adjusting screw 70 and the lock nut 69 face the opening 72, they can be easily accessed for adjustment through the opening 72 by removing the lid 73. The adjusting screws 62 and lock nuts 61 are also easily accessible for adjustment through the opening 72 via a gap between the cam shaft 31 and the shaft 66 because these shafts are spaced in opposite directions from adjusting screws 62 and lock nuts 61.

As shown in FIG. 2, the cam shaft 31 is supported at its both ends and intermediate portion by a case 34. For each of cylinders 14 and 15, cams 64 and 64 for actuating the valves and the cam 68 for actuating the fuel injection pump are spaced vertically. The cam 68 is positioned at the same level as the central line O—O.

A lubricating oil pump 78 has a pump shaft 79 connected to the lower end of the cam shaft 31. The lubricating pump 78 is fastened to the lower side of the case 34 by means of bolts. The inlet portion of the lubricating oil pump 78 communicates with an oil pan (not shown) through an oil passage drilled through the case 34, cylinder head 19 and cylinder block 18. The oil pan is formed by a case which encases the output shaft (not shown) extending downwardly from the lower end of the crankshaft 11. The outlet portion of the lubricating oil pump 78 is connected to every portion of the engine through an oil passage (not shown) drilled through the case 34, cylinder head 19 and cylinder block 18.

The upper end portion of the cam shaft 31 projects above the case 34. A pulley 81 fixed to the projected upper end of the cam shaft 31 is drivingly connected to another pulley 82 fixed to the upper portion of the crankshaft 11 by means of a timing belt 83. A generator 84 is connected to the fly-wheel 12 at the upper side of the pulley 82. A ring gear 85 on the outer periphery of the fly-wheel 12 is adapted to be driven by a starter 86 secured to a portion 30 of the crank case 36. An oil filling port 87 projecting obliquely upwardly is formed in the upper portion of the bottom wall (front wall) of the crank case 36. A governor 88 is attached to the cylinder block 18 while a fuel injection rate increasing device 89 which operates during starting up of the engine is secured to the cylinder head 19. The governor 88 is adapted to be driven through a timing belt 83. The governor 88 and the fuel injection rate increasing device 89 are connected to the plunger 93 of the fuel injection pump 56 shown in FIG. 6 through a lever mechanism 90.

As will be seen from FIG. 6, the governor 88 is disposed adjacent to the crank case 36 at the rear side of the same and to the right of the cylinder block 18. A lubricating oil strainer 100 is disposed at the left side of the cylinder block 18. As explained before, the fuel injection pump 56 is mounted in the cylinder head 19 as a unit with the fuel injection nozzle 28. Thus, the engine in accordance with the present invention has large components such as the fuel injection pump 56, governor 88 and lubricating oil strainer 100, among which the fuel injection pump 56 is incorporated in the cylinder head 19, while the governor 88 and the lubricating oil strainer 100 are built in the cylinder block 18. Therefore, the engine as a whole exhibits a substantially oval or egg-like form when viewed from the upper side as shown in FIG. 6, such shape being quite suitable for a marine outboard engine. Needless to say, the engine as a whole is covered by a case (not shown) of the outboard engine.

An intake pipe 101 is connected at its one end to the intake port 22 at the right side of the cylinder head 19 while the other end is mounted onto the crank case 36 at the portion near the bottom thereof. The intake pipe 101 extends along a right side surfaces of the cylinder block 18 and the crank case 36 and the inlet-side portion thereof turns round to the front side of the crank case 36 to reach portion near the central plane $O_1$—$O_1$. By adopting such a long intake pipe, it is possible to enhance the intake inertia effect to improve the performance of the engine.

As has been described, since the intake pipe 101 extends from the right side to the front side of the crank case 36 and since the starter 86 projects to the left forward side of the crank case 36, it is possible to obtain a symmetry of the engine as a whole with respect to the longitudinal axis thereof. Furthermore, the balance or symmetry in the case 34 of the valve arm 59 can be attained by making the unit injector 57 project to the right side while disposing the cam shaft 31 and the valve arms 32 at the left side.

Figure 7:
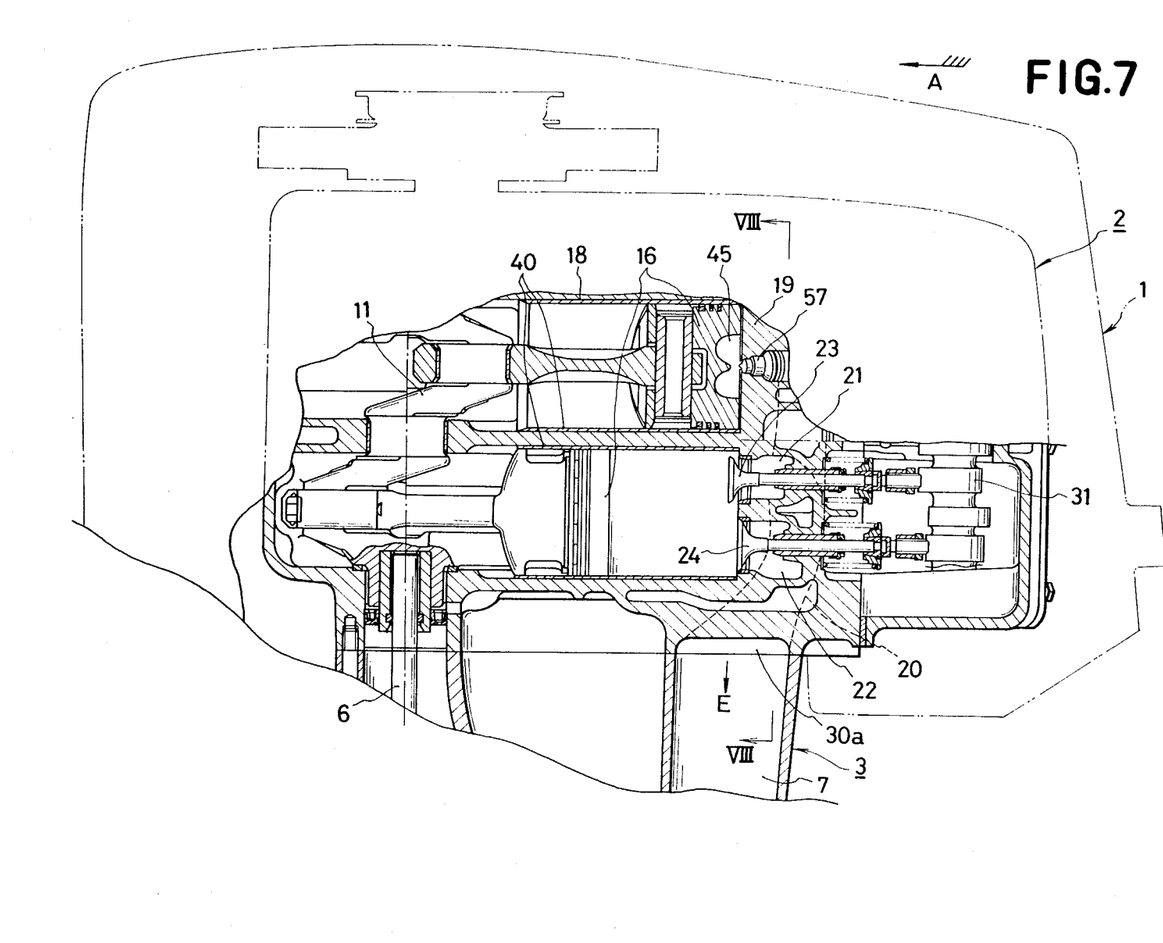
FIG. 7 is a side elevational view of an outboard engine mounting a diesel engine in accordance with a second embodiment of the invention.
Figure 8:
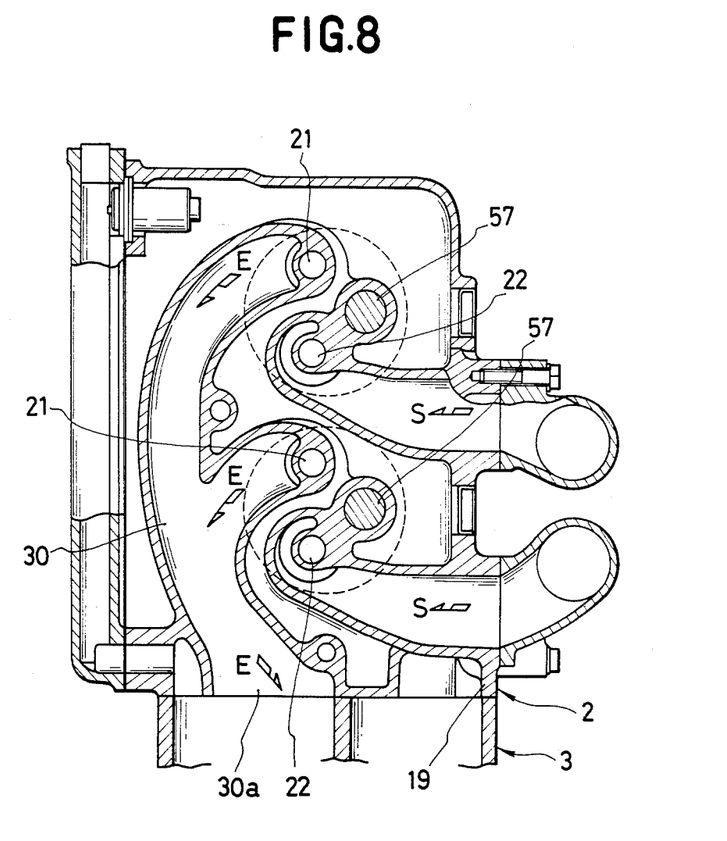
FIG. 8 is a sectional view taken along the line VIII—VIII of FIG. 7.

FIGS. 7 and 8 show a 4-cycle water-cooled diesel engine as a second embodiment of the invention applied to a marine outboard engine.

In the operation of this second embodiment, as the fuel is injected from unit injectors 57 mounted in the cylinder head 19, two pistons 16 in the cylinder liners 40 built in the cylinder block 18 are made to move reciprocatingly in the horizontal directions thereby to drive the vertical crankshaft 11 which in turn drives the propeller 4 through the thrust shaft 6.

As shown in FIGS. 7 and 8, fresh air or mixture is introduced as indicated by an arrow S through the intake ports 22 communicating with respective combustion chambers 45. The gas generated as a result of the combustion is discharged through respective exhaust ports 21 as indicated by arrows E. These two exhaust ports 21 are connected to a common exhaust passage 7 formed in the body 3 of the outboard engine as shown in FIG. 1 through an exhaust manifold 30.

Namely, the outlet of the exhaust mainfold 30 opens in the joint surface between the diesel engine 2 and the body 3 of the outboard engine. In addition, this outlet 30a is disposed at the same side of the diesel engine 2 as the cylinder block 18, i.e. closer to the crank center. The cylinder head 19 and the cylinder block 18 are formed from aluminum as a unit.

As has been described, in the diesel engine 2 of the second embodiment, the exhaust manifold 30 is formed as a unit with the cylinder head 19 or the cylinder block 18, so that it is not necessary to use a separate exhaust manifold unlike the conventional engines. The elimination of the separate exhaust manifold affords a compact construction of the engine as a whole and remarkably reduces the number of parts, as well as the number of steps of the assembling process.

In the case of the marine outboard engine, since the engine as a whole is covered by a cowling, it is important to surround the exhaust manifold by water to prevent the temperature rise in the cowling 100 by the heat derived from the exhaust manifold which is heated to a high temperature. However, the provision of a water-cooled exhaust manifold separate from the cylinder head and the cylinder block is not preferred because such a manifold will increase the weight as well as the number of parts.

In contrast, according to the invention, the exhaust passage is extended through the cooling water jacket 20 formed in the cylinder head 19 and the cylinder block 18 so that the water-cooled manifold can be formed without requiring any additional provision of the water chamber around the exhaust passage. This arrangement is superior to the conventional one because it contributes to the reduction in the weight, number of parts and the size.

The breadth of the outboard engine 3 and, hence, the weight of the outboard engine as a whole is undesirably increased if the exhaust opening 21 is projected from the end surface of the cylinder head 19. It will be clear to those skilled in the art that the outboard engine can be made lighter in weight and more compact as the exhaust opening 21 is positioned closer to the crankshaft 11, and this effect is further enhanced by positioning the exhaust opening 21 at the juncture between the cylinder head 19 and the cylinder block 18.

The arrangement of the parts of the engine of the described embodiment may be inverted with respect to the neutral axis of the engine. The invention does not exclude to form the portion 37 of the crank case 36 separately from the cylinder block 18, and the invention can be embodied as an engine having a single cylinder or more than three cylinders. It is also possible to provide a vortex flow chamber within the cylinder block 18. It is also not essential to form the fuel injection nozzle 28 and the fuel injection pump 56 as a unit. Namely, the fuel injection nozzle 28 and the fuel injection pump 56 may be constructed separately from each other and connected to each other through a high-pressure tube. It is even possible to apply the diesel engine of the invention to any other use than as an outboard engine. It is also possible to apply the invention to an engine in which the plane O—O of the axes of cylinders extends vertically.

As has been described, according to the invention, there is provided a diesel engine in which the cylinder block and the cylinder head are formed as a unit from the light-weight metal such as aluminum, an aluminum alloy or the like, and intake and exhaust ports are formed in the cylinder head. Thanks to the structural features as summarized above, the diesel engine of the invention offers the following advantages;

(a) The weight of the engine can be reduced as compared with conventional engines in which the cylinder block and the cylinder head are formed from cast iron. The reduced weight in turn affords an increased output power per unit weight of the engine as compared with the conventional engines.

(b) The number of parts is decreased, as well as the weight, and the assembling is facilitated because it is not necessary to unite the cylinder block and the cylinder head by bolts through a gasket or a like member, unlike the conventional engines.

(c) A higher cooling effect can be attained because of elimination of the gasket serving as a heat insulator between the cylinder head and the cylinder block.

(d) The undesirable deformation of the liner is prevented because of the elimination of the necessity for the tightening of the cylinder head by head bolts, so that the life of the liner is prolonged and the maintenance of the same is facilitated.

(e) Although a high pressure is produced in the cylinder as in the case of ordinary diesel engines, the leak of gas, cooling water and lubricating oil can be avoided perfectly because the cylinder block and the cylinder head are constructed as an integral unit. It is therefore possible to increase the combustion pressure to attain higher output power of the engine.

(f) The weight of the engine can be decreased thanks to the elimination of thickened portions around the jointing surfaces of the cylinder head and the cylinder block in the conventional engines.

(g) The combustion chamber defined by the unitary structure of the cylinder block and the cylinder head can have various forms which enhance the mechanical strength of the engine.

(h) The freedom of selection of the positions of the exhaust ports and intake ports is increased thanks to the elimination of the head bolts.

What is claimed is:

1. A water-cooled diesel engine for use as a marine outboard engine, including a cylinder block and a cylinder head formed as an integral unit from a lightweight alloy of aluminum and having a combustion chamber, a corner position of said combustion chamber formed by said cylinder block and said cylinder head being rounded to have an arcuate cross-section; at least one dry liner integrally cast in said cylinder block and provided with a honed inner peripheral surface, a radially outwardly recessed honing relief portion being formed in an end portion of said inner peripheral surface of said dry liner adjacent to the end of said combustion chamber, the end of said dry liner being positioned below said rounded corner portion of said combustion chamber and extending above the location of a top ring on a piston positioned at top dead center in said liner whereby honing of said cylinder block is avoided; and intake ports and exhaust ports formed in said cylinder head, said exhaust ports being in communication with an exhaust manifold formed integrally with said cylinder block and said cylinder head.

2. A water-cooled diesel engine for use as a marine outboard engine according to claim 1, wherein said engine has a fuel injection device including at least one unit injector.

3. A water-cooled diesel engine for use as a marine outboard engine according to claim 1, wherein said exhaust manifold is surrounded by a cooling water jacket and formed integrally in either said cylinder head or said cylinder block.

4. A water-cooled diesel engine for use as a marine outboard engine according to claim 1 wherein said exhaust manifold is formed in said cylinder head and has an outer opening in a joint surface of said cylinder head or said cylinder block at which it is jointed to a body of said outboard engine.

5. An overhead cam type water cooled diesel engine wherein a camshaft for driving intake valves and exhaust valves of the engine and a unit fuel injector of the engine are disposed substantially alongside a vertical center plane of the engine, a governor is disposed on a cylinder block of the engine on a side thereof proximately the unit fuel injector, an oil strainer is disposed on a side of the cylinder block proximate the camshaft, an intake port is formed in a cylinder head of the engine proximate the unit fuel injector, and an intake pipe communicating with the intake port is disposed to extend around a backside of the governor to a front side of a crankcase of the engine proximate the vertical center plane thereof.

6. An overhead cam type water cooled diesel engine wherein a camshaft for driving intake valves and exhaust valves of the engine and a unit fuel injector of the engine are disposed substantially alongside a vertical center plane of the engine, a governor is disposed on a cylinder block of the engine on a side thereof proximately the unit fuel injector, an oil strainer is disposed on a side of the cylinder block proximate the camshaft, an oil filling port is formed on the front side of the crankcase substantially along the vertical center plane of the engine, and a starter is disposed on the front side of the crankcase opposite the intake pipe extending thereto, the starter and intake pipe being disposed on opposite sides of the oil filling port, respectively.

* * * * *